(12) United States Patent
Suo et al.

(10) Patent No.: US 8,538,445 B2
(45) Date of Patent: Sep. 17, 2013

(54) METHOD AND SYSTEM FOR TRANSMITTING AN UPLINK CHANNEL SOUNDING PILOT AND BASE STATION AND USER EQUIPMENT

(75) Inventors: Shiqiang Suo, Beijing (CN); Yongjun Deng, Beijing (CN); Guoqing Li, Beijing (CN); Zhuo Gao, Beijing (CN); Li Chen, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 757 days.

(21) Appl. No.: 12/598,079

(22) PCT Filed: Apr. 30, 2008

(86) PCT No.: PCT/CN2008/070852
§ 371 (c)(1),
(2), (4) Date: Mar. 31, 2010

(87) PCT Pub. No.: WO2008/134981
PCT Pub. Date: Nov. 13, 2008

(65) Prior Publication Data
US 2010/0184444 A1    Jul. 22, 2010

(30) Foreign Application Priority Data
Apr. 30, 2007    (CN) .......................... 2007 1 0098983

(51) Int. Cl.
*H04W 72/00*    (2009.01)
*H04W 4/00*    (2009.01)
(52) U.S. Cl.
USPC .......................................... 455/450; 370/329
(58) Field of Classification Search
None
See application file for complete search history.

(56) References Cited

U.S. PATENT DOCUMENTS

| | | | |
|---|---|---|---|
| 2004/0081123 A1* | 4/2004 | Krishnan et al. | 370/329 |
| 2005/0243939 A1 | 11/2005 | Jung et al. | |
| 2007/0211656 A1* | 9/2007 | Kwak et al. | 370/319 |
| 2009/0046674 A1* | 2/2009 | Gao et al. | 370/337 |

FOREIGN PATENT DOCUMENTS

| | | |
|---|---|---|
| CN | 1708999 A | 11/2005 |
| CN | 101005326 A | 7/2007 |
| CN | 101064701 A | 10/2007 |

OTHER PUBLICATIONS

3rd Generation Partnership Project, Technical Specification Group Radio Access Network, Physical Channels and Modulation, release 8, 3GPP TS 36.211 v1.0.0, Mar. 2007, pp. 23-24.

* cited by examiner

*Primary Examiner* — Erika A Washington
(74) *Attorney, Agent, or Firm* — Ladas & Parry LLP

(57) ABSTRACT

A method for transmitting an uplink channel sounding pilot is used in the Long Term Evolution Project. The method includes: receiving, by a User Equipment, an uplink channel sounding pilot scheduling signaling; and transmitting, by the User Equipment, an uplink channel sounding pilot according to an indication in the uplink channel sounding pilot scheduling signaling. The uplink channel sounding pilot scheduling signaling includes one of or a combination of indication information including transmission starting time, a transmission period, duration, a subcarrier index, a subframe index, a long block index and a frequency band of the uplink channel sounding pilot. A system for transmitting an uplink channel sounding pilot, a base station and a User Equipment are also disclosed. With the use of the invention, a User Equipment may be dynamically scheduled to transmit an uplink channel sounding pilot, a solution for carrying the uplink channel sounding pilot scheduling signaling is provided, and a solution for determining the position of the uplink channel sounding pilot in the subframe is also be provided, thereby the position of the uplink channel sounding pilot in the subframe can more accurately reflect the conditions of the channel on which uplink and/or downlink processing is performed according to the uplink channel sounding pilot.

8 Claims, 6 Drawing Sheets

US 8,538,445 B2

METHOD AND SYSTEM FOR TRANSMITTING AN UPLINK CHANNEL SOUNDING PILOT AND BASE STATION AND USER EQUIPMENT

CROSS-REFERENCE TO RELATED APPLICATIONS

The present application claims the priority of Chinese patent application No. 200710098983.7, filed on Apr. 30, 2007, titled "METHOD AND SYSTEM FOR TRANSMITTING AN UPLINK CHANNEL SOUNDING PILOT AND BASE STATION AND USER EQUIPMENT", the disclosure of which is incorporated herein by reference in its entirety.

FIELD OF THE INVENTION

The present invention relates to the field of wireless communication technologies, and in particular, to a method and a system for transmitting an uplink channel sounding pilot, a base station and a User Equipment (UE).

BACKGROUND OF THE INVENTION

In order to meet the increasing requirements in the mobile communication system, and particularly, in order to meet the requirements of a higher data rate, a lower time delay, an improved system capacity, coverage area and the like, the 3rd Generation Partnership Project (3GPP) organization starts a Long Term Evolution (LTE) project.

In the existing LTE project, physical resources are shared by all users, and the physical resources are allocated and scheduled by a base station. The LTE project involves a Data demodulation (DM) pilot for providing information on uplink channel estimation and uplink coherent demodulation and detection, which is similar to an uplink pilot in an existing 3G system. As described above, in order to allocate and schedule uplink physical resources, for example, in the case that channel conditions are degraded in a frequency band in which a User Equipment transmits data or the frequency band resources are insufficient, the base station is required to adjust the frequency band in which the User Equipment transmits data, in addition to the DM pilot. In view of the above, an uplink Channel Sounding (CS) pilot is further introduced in the LTE project for sounding the uplink channel quality.

For example, a User Equipment may transmit a CS pilot in one or more frequency bands, and after a base station receives the CS pilot from the User Equipment, the base station may estimate the channel quality in the one or more frequency bands according to the CS pilot, to determine a frequency band with a better channel quality within which the User Equipment transmits data. Thus, the uplink frequency band resources may be allocated and scheduled.

A CS pilot may be carried in a subframe of a radio frame. In the LTE project, different frame structures are employed in various duplexing modes. The duplexing modes in the LTE project include a Time Division Duplexing (TDD) mode and a Frequency Division Duplexing (FDD) mode. FIG. 1 shows a diagram of the frame structure used in the TDD mode. As shown in FIG. 1, a radio frame includes two half frames with the same length. The radio frame includes Subframes 0 to 9, where Subframes 1 and 6 include three special time slots, including a Downlink Pilot Time Slot (DwPTS), a Guard Period (GP) and an Uplink Pilot Time Slot (UpPTS). The 8 general subframes may be divided into uplink subframes and downlink subframes. A CS pilot is carried in an uplink subframe. Additionally, it is proposed to employ OFDM technologies in the LTE project at present, and a general subframe of the LTE project includes 14 OFDM symbols.

In the present developing LTE standard, there is no particular solution in which a CS pilot is transmitted in the TDD mode.

SUMMARY OF THE INVENTION

The invention provides a method and a system for transmitting an uplink channel sounding pilot and a base station and a User Equipment, thereby realizing the transmission of the uplink channel sounding pilot.

For this purpose, an embodiment of the invention provides a method for transmitting an uplink channel sounding pilot, including:

receiving, by a User Equipment, an uplink channel sounding pilot scheduling signaling; and transmitting, by the User Equipment, an uplink channel sounding pilot according to an indication in the uplink channel sounding pilot scheduling signaling.

The uplink channel sounding pilot scheduling signaling includes one of or a combination of indication information comprising transmission starting time, a transmission period, duration, a resource block index, a subcarrier index, a subframe index, a long block index and a frequency band of the uplink channel sounding pilot.

The method further includes: transmitting, by a base station, the uplink channel sounding pilot scheduling signaling to the User Equipment.

Transmitting the uplink channel sounding pilot scheduling signaling includes:

transmitting the uplink channel sounding pilot scheduling signaling via a physical layer signaling.

Transmitting the uplink channel sounding pilot scheduling signaling includes: adding an uplink channel sounding pilot scheduling field, which is used for carrying the uplink channel sounding pilot scheduling signaling, to an uplink transfer scheduling signaling, and transmitting the uplink transfer scheduling signaling.

Transmitting the uplink channel sounding pilot scheduling signaling includes:

if the uplink channel sounding pilot scheduling signaling is carried in an uplink transfer scheduling signaling, and an indication field, which used to indicate that the signaling presently transferred is an uplink channel sounding pilot scheduling signaling, is set in the uplink transfer scheduling signaling, transmitting the uplink transfer scheduling signaling.

Transmitting the uplink channel sounding pilot scheduling signaling to the User Equipment includes:

transmitting the uplink channel sounding pilot scheduling signaling including a subframe containing the uplink channel sounding pilot to the User Equipment, where the subframe containing the uplink channel sounding pilot is an uplink subframe that is closest to and separated from a subframe to be processed according to the uplink channel sounding pilot by at least the time for the processing;

transmitting the uplink channel sounding pilot by the User Equipment according to the indication in the uplink channel sounding pilot scheduling signaling includes: transmitting the uplink channel sounding pilot by the User Equipment via the subframe as indicated in the uplink channel sounding pilot scheduling signaling.

The position of the subframe containing the uplink channel sounding pilot is determined in that:

when the uplink channel sounding pilot is used for downlink processing, the subframe containing the uplink channel sounding pilot is an uplink subframe that is closest to and separated from a subframe on which the downlink processing is to be carried 5 out according to the uplink channel sounding pilot by at least the time for the downlink processing; or when the uplink channel sounding pilot is used for uplink processing, the subframe containing the uplink channel sounding pilot is an uplink subframe that is closest to and separated from a subframe on which the uplink processing is to be carried out according to the uplink channel sounding pilot by at least the time for the uplink processing; or when the uplink channel sounding pilot is used for both uplink processing and downlink processing, if a duration for the uplink processing is larger than a duration of one half frame, the position of the subframe containing the uplink channel sounding pilot is determined according to a related duration for the downlink processing; if a subframe that is positioned a duration for the downlink processing before an uplink-to-downlink switching point is not an uplink subframe, the position of the subframe containing the uplink channel sounding pilot is determined according to a related duration for the uplink processing; and if a duration for the uplink processing is not larger than a duration of one half frame and a subframe that is positioned a duration for the downlink processing before the uplink-to-downlink switching point is an uplink subframe, the position of the subframe containing the uplink channel sounding pilot is determined as a closest uplink subframe that is separated from an uplink subframe to be processed according to the uplink channel sounding pilot by at least a duration for the uplink processing and is separated from a downlink subframe to be processed according to the uplink channel sounding pilot by at least a duration for the downlink processing.

Transmitting the uplink channel sounding pilot by the User Equipment according to the indication in the uplink channel sounding pilot scheduling signaling includes:

transmitting, by the User Equipment, the uplink channel sounding pilot in a long block at a fixed position according to the indication in the uplink channel sounding pilot scheduling signaling.

Transmitting the uplink channel sounding pilot further includes:

when not all of the bandwidth of the long block is occupied by the uplink channel sounding pilot transmitted, using the remaining bandwidth of the long block to transfer data.

An embodiment of the invention further provides a system for transmitting an uplink channel sounding pilot, including: an uplink channel sounding pilot scheduling signaling transmitting device 910, an uplink channel sounding pilot scheduling signaling receiving device 920 and an uplink channel sounding pilot transmitting device 930, wherein:

the uplink channel sounding pilot scheduling signaling transmitting device 910 is located in a base station and is configured to transmit an uplink channel sounding pilot scheduling signaling to a User Equipment;

the uplink channel sounding pilot scheduling signaling receiving device 920 is located in the User Equipment and is configured to receive the uplink channel sounding pilot scheduling signaling transmitted from the uplink channel sounding pilot scheduling signaling transmitting device 910; and the uplink channel sounding pilot transmitting device 930 is located in the User Equipment and is configured to transmit an uplink channel sounding pilot according to an indication in the uplink channel sounding pilot scheduling signaling received by the uplink channel sounding pilot scheduling signaling receiving device 920.

The uplink channel sounding pilot scheduling signaling transmitting device 910 includes an uplink channel sounding pilot adding device 911 and an uplink transfer scheduling signaling transmitting device 912, where:

the uplink channel sounding pilot adding device 911 is configured to add an uplink channel sounding pilot scheduling field, which is used for carrying the uplink channel sounding pilot scheduling signaling, into an uplink transfer scheduling signaling; and the uplink transfer scheduling signaling transmitting device 912 is configured to transmit the uplink transfer scheduling signaling with the uplink channel sounding pilot scheduling field which is added by the uplink channel sounding pilot adding device 911.

The uplink channel sounding pilot scheduling signaling transmitting device 910 includes an indication field setting device 913 and an uplink transfer scheduling signaling transmitting device 912, where:

the indication field setting device 913 is configured to set, in an uplink transfer scheduling signaling, an indication field for indicating whether an uplink transfer scheduling signaling or an uplink channel sounding pilot scheduling signaling is carried in the uplink transfer scheduling signaling; and the uplink transfer scheduling signaling transmitting device 912 is configured to transmit the uplink transfer scheduling signaling scheduling signaling in which the indication field setting device 913 sets the indication field.

The uplink channel sounding pilot scheduling signaling transmitted by the uplink channel sounding pilot scheduling signaling transmitting device 910 includes a subframe containing the uplink channel sounding pilot, the subframe containing the uplink channel sounding pilot is an uplink subframe that is closest to and separated from a subframe to be processed according to the uplink channel sounding pilot by at least the processing time;

the uplink channel sounding pilot scheduling signaling receiving device 920 receives the uplink channel sounding pilot scheduling signaling; and the uplink channel sounding pilot transmitting device 930 transmits the uplink channel sounding pilot via the subframe as indicated in the uplink channel sounding pilot scheduling signaling received by the uplink channel sounding pilot scheduling signaling receiving device 920.

An embodiment of the invention further provides a base station for transmitting an uplink channel sounding pilot scheduling signaling, including: an uplink channel sounding pilot scheduling signaling transmitting device 910, configured to transmit an uplink channel sounding pilot scheduling signaling to a User Equipment.

The uplink channel sounding pilot scheduling signaling transmitting device 910 includes an uplink channel sounding pilot adding device 911 and an uplink transfer scheduling signaling transmitting device 912, where:

the uplink channel sounding pilot adding device 911 is configured to add an uplink channel sounding pilot scheduling field, which is used for carrying the uplink channel sounding pilot scheduling signaling, to an uplink transfer scheduling signaling; and the uplink transfer scheduling signaling transmitting device 912 is configured to transmit the uplink transfer scheduling signaling with the uplink channel sounding pilot scheduling field which is added by the uplink channel sounding pilot adding device 911.

The uplink channel sounding pilot scheduling signaling transmitting device 910 includes an indication field setting device 913 and an uplink transfer scheduling signaling transmitting device 912, where:

the indication field setting device 913 is configured to set, in an uplink transfer scheduling signaling, an indication field for indicating whether an uplink transfer scheduling signaling or an uplink channel sounding pilot scheduling signaling is carried in the uplink transfer scheduling signaling; and the uplink transfer scheduling signaling transmitting device 912 is configured to transmit the uplink transfer scheduling signaling in which the indication field setting device 913 sets the indication field.

An embodiment of the invention further provides a User Equipment for transmitting an uplink channel sounding pilot, including: an uplink channel sounding pilot scheduling signaling receiving device 920 and an uplink channel sounding pilot transmitting device 930, where:

the uplink channel sounding pilot scheduling signaling receiving device 920 is configured to receive an uplink channel sounding pilot scheduling signaling; and the uplink channel sounding pilot transmitting device 930 is configured to transmit an uplink channel sounding pilot according to an indication in the uplink channel sounding pilot scheduling signaling received by the uplink channel sounding pilot scheduling signaling receiving device 920.

The uplink channel sounding pilot scheduling signaling received by the uplink channel sounding pilot scheduling signaling receiving device 920 includes a subframe containing the uplink channel sounding pilot, the subframe containing the uplink channel sounding pilot is an uplink subframe that is closest to and separated from a subframe to be processed according to the uplink channel sounding pilot by at least the time for the processing; and the uplink channel sounding pilot transmitting device 930 transmits the uplink channel sounding pilot via the subframe as indicated in the uplink channel sounding pilot scheduling signaling received by the uplink channel sounding pilot scheduling signaling receiving device 920.

As can be seen from the above technical solutions of the invention, by transmitting a CS pilot scheduling signaling to a User Equipment, and transmitting an uplink channel sounding pilot by the User Equipment according to an indication in the CS pilot scheduling signaling, the User Equipment may be dynamically scheduled to transmit a CS pilot, a solution for carrying a CS pilot scheduling signaling is provided, and a solution for determining the position of the CS pilot in the subframe is also provided, so that the position of the CS pilot in the subframe can more accurately reflect the conditions of a channel on which uplink and/or downlink processing is performed according to the CS pilot.

DETAILED DESCRIPTION OF THE EMBODIMENTS

An embodiment of the invention provides a method for transmitting an uplink channel sounding pilot. In the method, by transmitting a CS pilot scheduling signaling to a User Equipment, the User Equipment may transmit an uplink channel sounding pilot according to an indication in the CS pilot scheduling signaling.

It will be appreciated by those skilled in the art that the CS pilot scheduling signaling here is not limited to the above signaling that indicates the transmission frequency band of a CS pilot, and may include information related to the transmission of the CS pilot.

In the current LTE standard, the transmission of a CS pilot in the FDD mode is preferred. To introduce the solution of transmitting the CS pilot in the FDD mode, the FDD frame structure is first introduced now.

Figure 1:
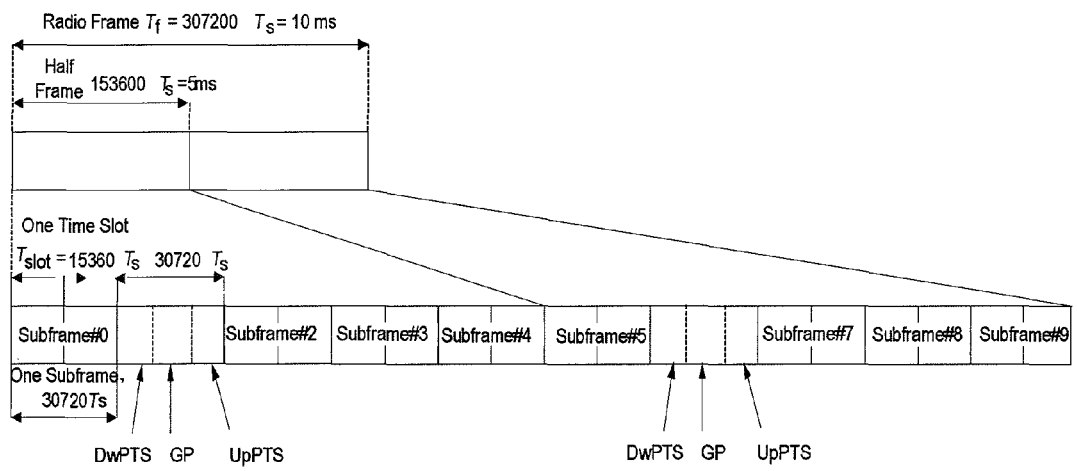
FIG. 1 is a diagram illustrating the structure of a subframe in the TDD mode in the Long Term Evolution project in the prior art.
Figure 2:
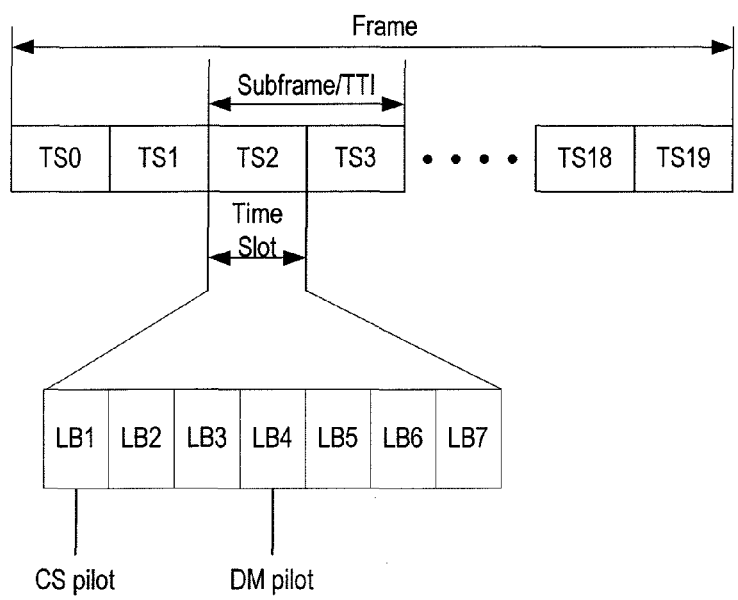
FIG. 2 is a diagram illustrating the structure of a subframe in the FDD mode in the Long Term Evolution project according to an embodiment of the invention.

FIG. 2 shows a frame structure in the FDD mode. As shown in FIG. 2, a frame includes 20 time slots with the same length. Two time slots construct a subframe, which is also referred to as a Transmission Time Interval (TTI). Each subframe includes several Long Blocks (LBs), and the length and number of the LBs in one subframe are different, depending on the length of a Cycle Prefix (CP) for the OFDM symbols (the CP, which is located between subframes, is not shown in the figure). For example, if a short CP (a general CP) is employed, 7 LBs are included in one time slot (as shown in FIG. 2); and if a long CP (an extended CP) is employed, 6 LBs are included in one time slot (not shown in FIG. 2). In the project, it has been substantially determined that a CS pilot in an uplink frame is transmitted in a LB other than the LB including a DM pilot, and it is preferred to transmit the CS pilot in a LB at a fixed position, for example, the first LB (LB1), and transmit the DM pilot in LB4; and it is preferred that the transmission period may be variable, for example, the transmission period may include one TTI, two TTIs or four TTIs.

However, in the TDD mode, it will be appreciated by those skilled in the art that each TTI includes one general subframe, and the uplink general subframe and the downlink general subframe are included in the same subframe, moreover, the uplink and downlink general subframes in a subframe are convertible. Thus, in the TDD mode, it is not appropriate to transmit a CS pilot in a fixed period; that is, the CS pilot is not allowed to be transmitted in a period based on one or more TTIs similarly to the FDD mode, because the uplink subframe including the CS pilot may be converted to another position in the subframe, therefore, the method for transmitting a CS pilot in the FDD mode is not applicable to the TDD mode.

Additionally, in the FDD mode, different frequency bands are allocated for the uplink and downlink transmission, and a CS pilot exists in an uplink subframe only and is used for uplink processing only; while in the TDD mode, an uplink general subframe and a downlink general subframe are included in the same subframe, and the CS pilot may also be used for both downlink processing and uplink processing, for example, downlink beamforming may be performed according to the direction of arrival of uplink, information required for downlink Multiple Input and Multiple Output (MIMO) may be computed according to the information obtained from the CS pilot, and the downlink channel quality may be obtained according to the uplink channel quality. Therefore, in the TDD mode, the influence of the CS pilot on the downlink processing needs to be taken into consideration.

For better understanding of the solution in the invention by those skilled in the art, the invention will now be further illustrated in detail in conjunction with the drawings and embodiments below.

According to the requirements to transmit a CS pilot in the TDD mode as described above, a dynamic scheduling mode may be employed in an embodiment of the invention; and in the dynamic scheduling mode, a User Equipment (UE) is scheduled by an Evolved NodeB (ENB) to transmit a CS pilot at a designated frequency band at designated time.

The method according to an embodiment of the invention is described below.

Figure 3:
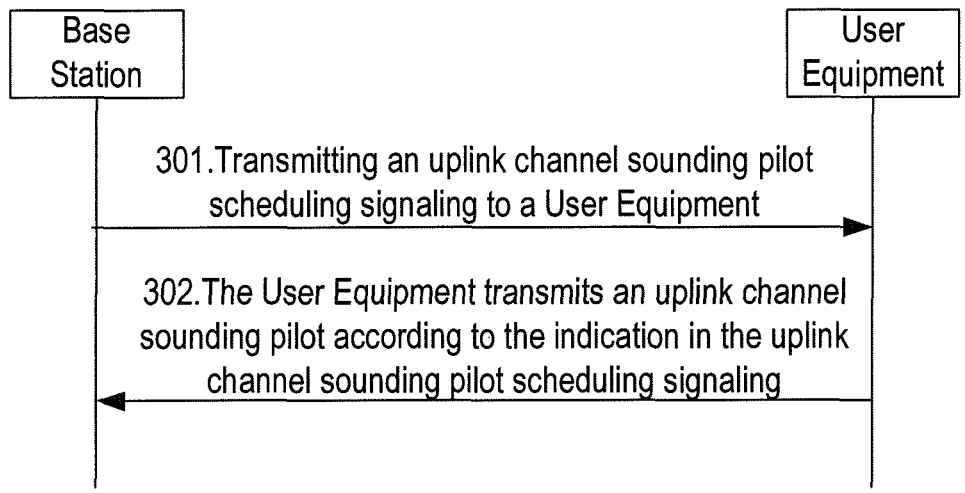
FIG. 3 is a flow chart of a method according to an embodiment of the invention.

FIG. 3 is a flow chart of the method according to an embodiment of the invention. As shown in FIG. 3, the method according to the embodiment of the invention includes the following processes.

Process 301: A CS pilot scheduling signaling is transmitted to a User Equipment.

In this process, the User Equipment receives the CS pilot scheduling signaling transmitted by a base station. The scheduling signaling indicates the related information of transmitting the CS pilot for the User Equipment; for example, the scheduling signaling may include one of or a combination of information such as transmission starting time, a transmission period, duration, a resource block index, a subcarrier index, a subframe index, a long block index and a frequency band. In a typical illustrative case, if the quality of an uplink channel via which the uplink data is received by the base station is degraded and the frequency sub-band in which the User Equipment transmits uplink data needs to be adjusted, the base station notifies the User Equipment to transmit a CS pilot to sound the uplink channel quality, and the content of the notification is the CS pilot scheduling signaling described here. This process is the premise for the User Equipment to transmit the CS pilot and embodies the concept of dynamic scheduling.

The base station may transmit the CS pilot scheduling signaling via explicit physical layer signaling, which is illustrated by the way of an example below.

Figure 4:
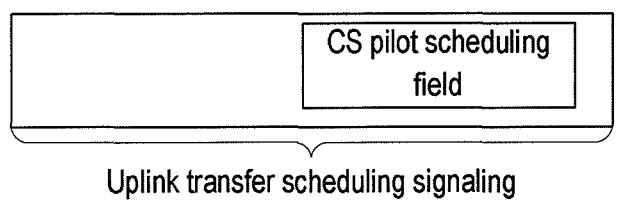
FIG. 4 is a diagram illustrating the format of an uplink transfer scheduling signaling with the uplink channel sounding pilot scheduling field added according to an embodiment of the invention.

For example, a CS pilot scheduling field, which is used for carrying the CS pilot scheduling signaling to indicate the information required for the User Equipment to transmit the CS pilot, is added to the existing uplink transfer scheduling signaling. The format of an uplink transfer scheduling signaling to which the CS pilot scheduling field is added may be as shown in FIG. 4.

Figure 5:
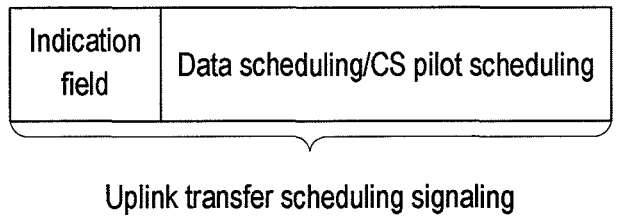
FIG. 5 is a diagram illustrating the format of an uplink transfer scheduling signaling with the indication field added according to an embodiment of the invention.

Alternatively, to transfer a CS pilot scheduling signaling, the existing uplink transfer scheduling signaling is used to carry the CS pilot scheduling signaling. In this case, an indication field is required to be added to the uplink transfer scheduling signaling to indicate whether uplink transfer scheduling signaling (for example, the indication field indicates data scheduling) or CS pilot scheduling signaling (for example, the indication field indicates CS pilot scheduling) is transferred currently. For example, setting the value of the indication field as 1 in the header indicates that the content of the current signaling is uplink transfer scheduling signaling, and an uplink transfer scheduling signaling is carried in the signaling part thereafter; setting the value of the indication field as 0 in the header indicates that the content of the current signaling is CS pilot scheduling signaling, and CS pilot scheduling signaling is carried in the signaling part thereafter. The signaling format in this case is as shown in FIG. 5.

Process 302: The User Equipment transmits a CS pilot according to the indication in the CS pilot scheduling signaling.

In this process, when receiving the CS pilot scheduling signaling, the User Equipment transmits a CS pilot according to the indication in the CS pilot scheduling signaling, i.e., according to indicated information such as transmission starting time, a transmission period, duration, a resource block index, a subcarrier index, an LB index and a frequency band. Corresponding to the two modes for transmitting the CS pilot scheduling signaling in process 301, the User Equipment receives the corresponding physical layer signaling.

The above method may also be applied in the FDD mode of the LTE project.

It is mentioned above that the CS pilot scheduling signaling transmitted may include a subframe index and an LB index. Thus, the position used to transmit a CS pilot by the User Equipment may be indicated.

Figure 6:
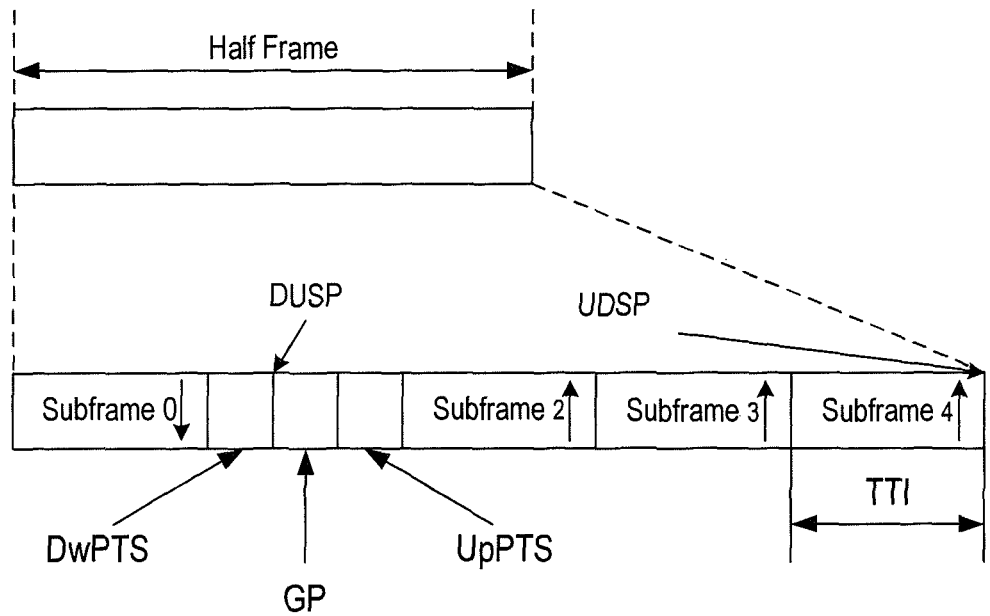
FIG. 6 is a diagram illustrating the structure of a half frame in which an uplink channel sounding pilot is carried in the TDD mode according to an embodiment of the invention.

Being different from the existing uplink subframe for carrying a CS pilot in the FDD mode, a subframe for carrying a CS pilot in the TDD mode includes an uplink subframe and a downlink subframe, a general subframe constructs a TTI. FIG. 6 shows an example of the half frame structure for carrying a CS pilot in the TDD mode. In the example as shown in FIG. 6, a subframe 0 is a downlink subframe, subframes 2 to 4 are uplink subframes, and a CS pilot is carried in a certain uplink subframe. An uplink/downlink switching point exists between adjacent uplink and downlink subframes, and the switching point may be a downlink-to-uplink switching point (DUSP) or an uplink-to-downlink switching point (UDSP). Here, a DUSP exists between DwPTS and GP, and a UDSP exists between a subframe 4 and a subframe 0.

Figure 7:
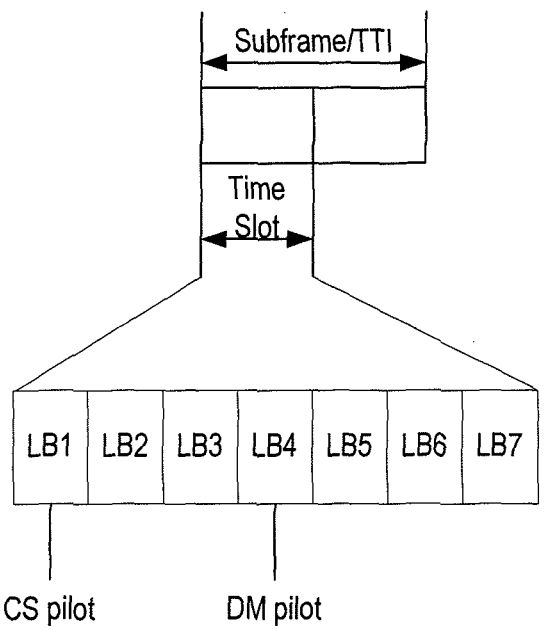
FIG. 7 is a diagram illustrating the structure of a subframe in which an uplink channel sounding pilot is carried in the TDD mode according to an embodiment of the invention.

Specifically, a subframe may include Long Blocks (LBs), and its structure may be as shown in FIG. 7, which is the same as the subframe structure in the FDD system as shown in FIG. 2.

In the TDD mode, the CS pilot is used not only for carrying out uplink processing such as the scheduling of uplink physical resources, but also for carrying out downlink processing, for example, downlink beamforming performed according to the direction of arrival of uplink, computing of the information required for downlink MIMO according to the information obtained from the CS pilot, and obtaining of the downlink channel quality according to the uplink channel quality, as mentioned above. Therefore, the position used for transmitting a CS pilot depends on the uplink processing and the downlink processing. Thereby, the transmission position of the CS pilot is determined by considering a principle that the position of the CS pilot shall be as close to the downlink subframe as possible.

No matter a CS pilot is used for the uplink processing or the downlink processing, the processing is carried out after the CS pilot is transmitted. Thus, in order to enable the CS pilot able to provide channel information as accurate as possible to a base station, i.e., in order to make the channel state when the CS pilot is transmitted is as temporally close as possible to the channel state when the uplink processing and the downlink processing are carried out, the position of the CS pilot is as close as possible to a downlink subframe related to the subsequent downlink processing as long as the processing capacity of the base station is sufficient.

At the same time, in order to simplify the system design, it is preferred that the position of the LB in which the CS pilot is transmitted is fixed. For example, the LB carrying the CS pilot may be the first LB in a subframe.

Additionally, if the CS pilot does not occupy all the bandwidth of the LB, the remaining bandwidth of the LB may be used for transmitting data by a User Equipment other than the User Equipment that transmits the CS pilot, this is to meet the single-carrier characteristic of the uplink data transmission of a User Equipment as required by the system. Therefore, a User Equipment is not allowed to transmit a CS pilot and data simultaneously.

Figure 8:
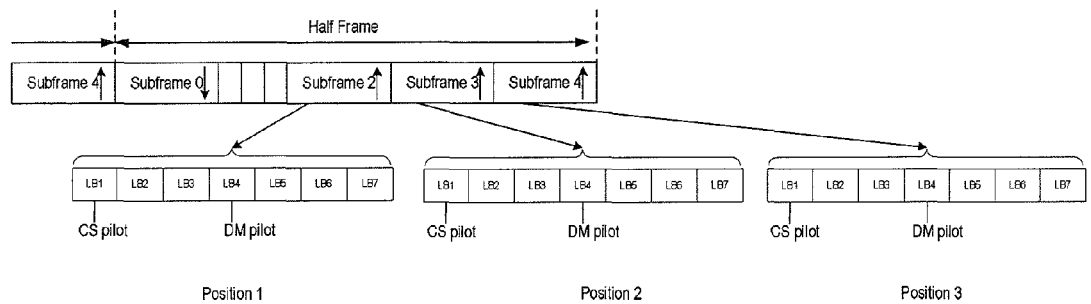
FIG. 8 is a diagram illustrating the positions of subframes including uplink channel sounding pilots according to an embodiment of the invention.

The basic principle for the position of a CS pilot in a subframe (i.e., an uplink subframe in which the CS pilot is located among subframes) is that the subframe including the CS pilot is nearest to a subframe to be processed according to the CS pilot but sufficient base station processing time should be ensured. The processing time may be determined according to the load of the base station. In other words, the subframe including the CS pilot is an uplink subframe that is closest to and separated from the subframe to be processed according to the CS pilot by at least the processing time, for example, the first uplink subframe that is separated from the subframe to be processed according to the CS pilot by the processing time. Considering that the subframe to be processed according to the CS pilot may be an uplink subframe and/or a downlink subframe, the position of the subframe including the CS pilot may be determined depending on three cases that the CS pilot is used for the downlink processing, the CS pilot is used for the uplink processing, and the CS pilot is used for both the uplink processing and the downlink processing. In an example in which subframes 2 to 4 in a half frame are uplink subframes and the other subframes are downlink subframes, positions of subframes including a CS pilot is shown in FIG. 8. Such three cases are now specifically described, respectively.

A first case where the CS pilot is used for the downlink processing.

For example, in the first case, the CS pilot may be used for processing the related information of downlink MIMO.

In the first case, the base station predicts the time for processing the CS pilot according to its load, where the predicted processing time may be denoted by, taking TTI as the unit, which means that the predicted processing time may be one or more TTIs. Thus, the CS pilot may be transmitted in the $n^{th}$ uplink subframe before UDSP.

Specifically, if the base station predicts that the processing may be accomplished in three TTIs, the CS pilot may be transmitted in a subframe 2, i.e., a position 1 shown in FIG. 8, that is, the CS pilot may be transmitted in the subframe 2 that is the third subframe before UDSP (counted down from UDSP in an order of a subframe 4, a subframe 3 and a subframe 2), thus, the CS pilot may be used for the downlink processing in a subframe 0 that is three TTIs (i.e. the predicted processing time) after the subframe 2, and therefore, the CS pilot is closest to the time for the downlink processing; similarly, if the base station predicts that the processing may be accomplished in two TTIs, the CS pilot may be transmitted in the subframe 3 that is the second subframe before UDSP; and if the base station predicts that the processing may be accomplished in one TTI, the CS pilot may be transmitted in the subframe 4 that is the first subframe before UDSP.

Additionally, if the $n^{th}$ (n denotes the predicted processing time) subframe before UDSP is not an uplink subframe, the CS pilot may be transmitted in an uplink subframe that is before and closest to the $n^{th}$ subframe. For example, if the base station predicts that the processing may be accomplished in a duration of four TTIs, the CS pilot may be transmitted in the subframe 4 and be used for the downlink processing on the next half frame, that is, for the downlink processing on a subframe starting from the subframe 0 of the next half frame.

Generally, in this case, the subframe including the CS pilot is an uplink subframe that is closest to and separated from a subframe on which the downlink processing is to be carried out according to the CS pilot by at least the time for the processing.

A second case where the CS pilot is used for the uplink processing.

For example, in the second case, the CS pilot may be used for the scheduling of uplink physical resources.

In the second case, the base station predicts a processing time of the CS pilot according to its load. If the processing time T1=subframe 4+subframe 0, the CS pilot may be transmitted at a position 3 shown in FIG. 8, thus the CS pilot may be used for the uplink processing on the subframe 2 in the next half frame after time T1; similarly, if the processing time T2=subframe 2+subframe 3+T1, the CS pilot may be transmitted at a position 1 shown in FIG. 8, thus the CS pilot may be used for the uplink processing on the subframe 2 in the next half frame after time T2; and the case that the CS pilot is transmitted at a position 2 is similar to the case that the CS pilot is transmitted at the position 1.

Generally, in the second case, the subframe including the CS pilot is an uplink subframe that is closest to and separated from a subframe on which the uplink processing is to be carried out according to the CS pilot by at least the processing time.

A third case where the CS pilot is used for both the uplink processing and the downlink processing.

For example, in the third case, the CS pilot may be used for the scheduling of uplink physical resources and the related computation of downlink MIMO. Specifically, the third case may be described in the following situations:

1) If a duration for the uplink processing is larger than the duration of one half frame, i.e., larger than the duration T2 mentioned above (here, T2 may be regarded as approximately equal to the duration of one half frame), the position of the CS pilot is determined according to a related duration for the downlink processing, so that the downlink processing can be performed more accurately.

2) If a subframe that is positioned a downlink processing duration before UDSP is not an uplink subframe, such as the case shown in FIG. 8 in which the duration for the downlink processing is four or five subframe durations, the position of the CS pilot is determined according to a related duration for the uplink processing, so that the uplink processing can be performed more accurately.

In brief, in the situations 1) and 2), the uplink processing or the downlink processing is not considered if the duration for the processing is excessively long, thus the time interval of the other processing may be the shortest.

3) If a duration for the uplink processing is not larger than the duration of one half frame and a subframe that is positioned a duration for the downlink processing before UDSP is an uplink subframe, for example, the duration for the downlink processing is less than three subframes, then both the uplink processing and the downlink processing may be considered, so that the time interval between the subframe carrying the CS pilot and the subframe to be processed according to the CS pilot can be the shortest. Therefore, in summary, in this situation, the subframe including the CS pilot should be a closest uplink subframe that is separated from an uplink subframe to be processed according to the CS pilot by at least a duration for the uplink processing, and is separated from a downlink subframe to be processed according to the CS pilot by at least a duration for the downlink processing.

Based on the example as shown in FIG. 8, the following situations may be exemplified briefly.

If the uplink-related processing can be accomplished in time T1 and the downlink processing can be accomplished in the duration of one subframe, the CS pilot is preferably transmitted in the subframe 4 shown in FIG. 8, i.e., in the position 3.

If the uplink-related processing can be accomplished in time T2 and the downlink processing can be accomplished in the duration of one subframe, the CS pilot is preferably transmitted in the subframe 2 shown in FIG. 8, i.e., in the position 1.

If the uplink-related processing can be accomplished in time T1 and the downlink processing can be accomplished in the duration of three subframes, the CS pilot is preferably transmitted in the subframe 2 shown in FIG. 8, i.e., in the position 1.

If the uplink-related processing can be accomplished in time T2 and the downlink processing can be accomplished in the duration of three subframes, the CS pilot is preferably transmitted in the subframe 2 shown in FIG. 8, i.e., in the position 1.

Thus, with the use of the method according to the embodiment of the invention, a User Equipment may be dynamically scheduled to transmit a CS pilot, a solution for carrying a CS pilot scheduling signaling is provided, and a solution for determining the position of the CS pilot in a subframe is also provided.

As can be seen from the above embodiment, by using the method of the invention, a User Equipment may be dynamically scheduled to transmit a CS pilot, and the position of the CS pilot in a subframe can more accurately reflect the condition of the channel on which uplink/downlink processing is performed according to the CS pilot.

Figure 9:
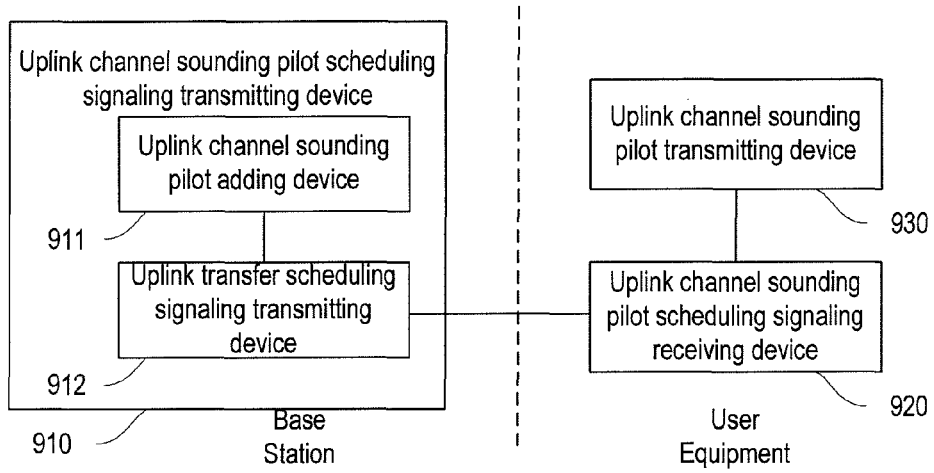
FIG. 9 is a diagram illustrating the structure of a system according to an embodiment of the invention.

A system for transmitting an uplink channel sounding pilot according to an embodiment of the invention is described below, and the diagram illustrating the structure of the system may be illustratively as shown in FIG. 9. As shown in FIG. 9, the system in this embodiment includes an uplink channel sounding pilot scheduling signaling transmitting device 910, an uplink channel sounding pilot scheduling signaling receiving device 920 and an uplink channel sounding pilot transmitting device 930.

The uplink channel sounding pilot scheduling signaling transmitting device 910 is configured to transmit an uplink channel sounding pilot scheduling signaling to a User Equipment.

The uplink channel sounding pilot scheduling signaling receiving device 920 is configured to receive the uplink channel sounding pilot scheduling signaling transmitted from the uplink channel sounding pilot scheduling signaling transmitting device 910.

The uplink channel sounding pilot transmitting device 930 is configured to transmit an uplink channel sounding pilot according to an indication in the uplink channel sounding pilot scheduling signaling received by the uplink channel sounding pilot scheduling signaling receiving device 920.

Preferably, the uplink channel sounding pilot scheduling signaling transmitting device 910 is integrated in a base station; the uplink channel sounding pilot scheduling signaling receiving device 920 and the uplink channel sounding pilot transmitting device 930 are integrated in a User Equipment.

The uplink channel sounding pilot scheduling signaling includes one of or a combination of indication information such as transmission starting time, a transmission period, duration, a resource block index, a subcarrier index, a subframe index, a long block index and a frequency band of the uplink channel sounding pilot.

The uplink channel sounding pilot scheduling signaling transmitting device 910 transmits the uplink channel sounding pilot scheduling signaling via a physical layer signaling.

The uplink channel sounding pilot scheduling signaling transmitting device 910 may include an uplink channel sounding pilot adding device 911 and an uplink transfer scheduling signaling transmitting device 912.

The uplink channel sounding pilot adding device 911 is configured to add an uplink channel sounding pilot scheduling field, which is used for carrying the uplink channel sounding pilot scheduling signaling, to an uplink transfer scheduling signaling.

The uplink transfer scheduling signaling transmitting device 912 is configured to transmit the uplink transfer scheduling signaling with the uplink channel sounding pilot scheduling field which is added.

Figure 10:
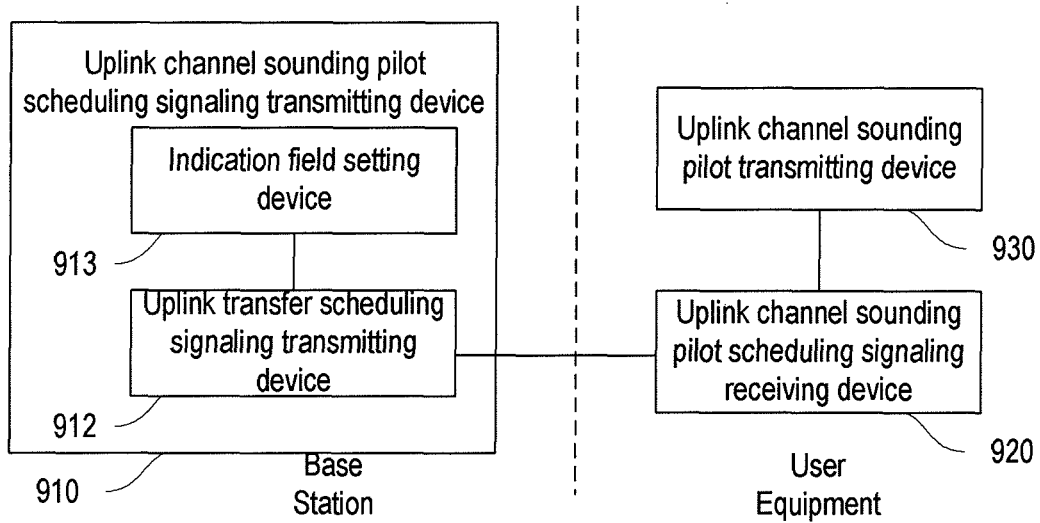
FIG. 10 is a diagram illustrating the structure of a system according to another embodiment of the invention.

Alternatively, the system according to the embodiment may be as shown in FIG. 10. The uplink channel sounding pilot scheduling signaling transmitting device 910 in the base station may include an indication field setting device 913 and an uplink transfer scheduling signaling transmitting device 912.

The indication field setting device 913 is configured to set, in an uplink transfer scheduling signaling, an indication field for indicating whether an uplink transfer scheduling signaling or an uplink channel sounding pilot scheduling signaling is carried in the uplink transfer scheduling signaling.

The uplink transfer scheduling signaling transmitting device 912 is configured to transmit the uplink transfer scheduling signaling in which the indication field is set.

Other devices shown in FIG. 10 are similar to those shown in FIG. 9, and description thereof is omitted.

The uplink channel sounding pilot scheduling signaling transmitted by the uplink channel sounding pilot scheduling signaling transmitting device 910 shown in FIG. 9 or 10 includes a subframe containing a uplink channel sounding pilot, where 5 the subframe is an uplink subframe that is closest to and separated from a subframe to be processed according to the uplink channel sounding pilot by at least the processing time.

Correspondingly, the uplink channel sounding pilot scheduling signaling receiving device 920 receives the uplink channel sounding pilot scheduling signaling; and the uplink channel sounding pilot transmitting device 930 transmits an uplink channel sounding pilot in the subframe as indicated in the uplink channel sounding pilot scheduling signaling received by the uplink channel sounding pilot scheduling signaling receiving device 920.

The subframe including the uplink channel sounding pilot is as follows:

when the uplink channel sounding pilot is used for downlink processing, the subframe including the uplink channel sounding pilot is an uplink subframe that is closest to and separated from a subframe on which the downlink processing is to be carried out according to the uplink channel sounding pilot by at least the time for the downlink processing; or when the uplink channel sounding pilot is used for uplink processing, the subframe including the uplink channel sounding pilot is an uplink subframe that is closest to and separated from a subframe on which the uplink processing is to be carried out according to the uplink channel sounding pilot by at least the time for the uplink processing; or when the uplink channel sounding pilot is used for both uplink processing and downlink processing, if a duration for the uplink processing is larger than a duration of one half frame, the position of the subframe including the uplink channel sounding pilot is determined according to a related duration for the downlink processing; if a subframe that is positioned a duration for the downlink processing before an uplink-to-downlink switching point is not an uplink subframe, the position of the subframe including the uplink channel sounding pilot is determined according to a related duration for the uplink processing; and if a duration for the uplink processing is not larger than a duration of one half frame and a subframe that is positioned a duration for the downlink processing before an uplink-to-downlink switching point is an uplink subframe, the position of the subframe including the uplink channel sounding pilot is determined as a closest uplink subframe that is separated from an uplink subframe to be processed according to the uplink channel sounding pilot by at least a duration for the uplink processing and is separated from a downlink subframe to be processed according to the uplink channel sounding pilot by at least a duration for the downlink processing.

Figure 11:
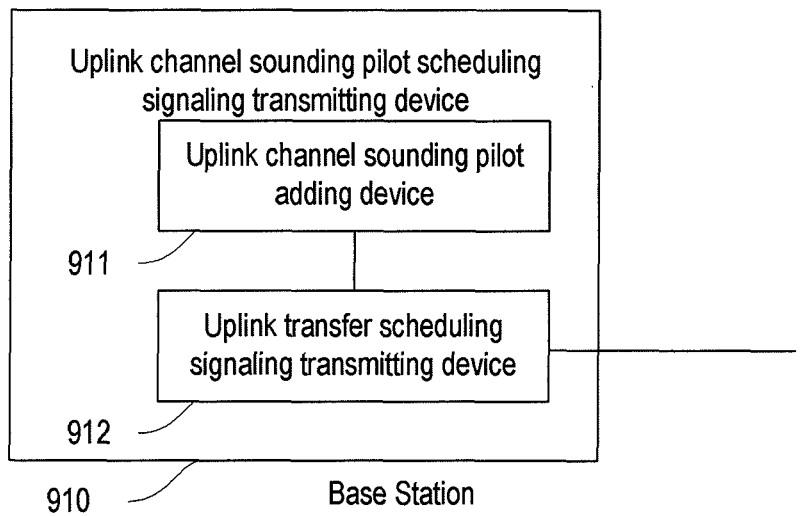
FIG. 11 is a diagram illustrating the structure of a base station according to an embodiment of the invention.

A base station according to an embodiment of the invention will now be introduced, and the diagram of the structure of the base station may be as shown in FIG. 11. The base station includes an uplink channel sounding pilot scheduling signaling transmitting device 910, which is configured to transmit an uplink channel sounding pilot scheduling signaling to a User Equipment.

The uplink channel sounding pilot scheduling signaling includes one of or a combination of indication information such as transmission starting time, a transmission period, duration, a resource block index, a subcarrier index, a subframe index, a long block index and a frequency band of the uplink channel sounding pilot.

The uplink channel sounding pilot scheduling signaling transmitting device 910 transmits the uplink channel sounding pilot scheduling signaling via physical layer signaling.

The uplink channel sounding pilot scheduling signaling transmitting device 910 includes an uplink channel sounding pilot adding device 911 and an uplink transfer scheduling signaling transmitting device 912.

The uplink channel sounding pilot adding device 911 is configured to add an uplink channel sounding pilot scheduling field, which is used for carrying the uplink channel sounding pilot scheduling signaling, to an uplink transfer scheduling signaling.

The uplink transfer scheduling signaling transmitting device 912 is configured to transmit the uplink transfer scheduling signaling with the uplink channel sounding pilot scheduling field which is added.

Figure 12:
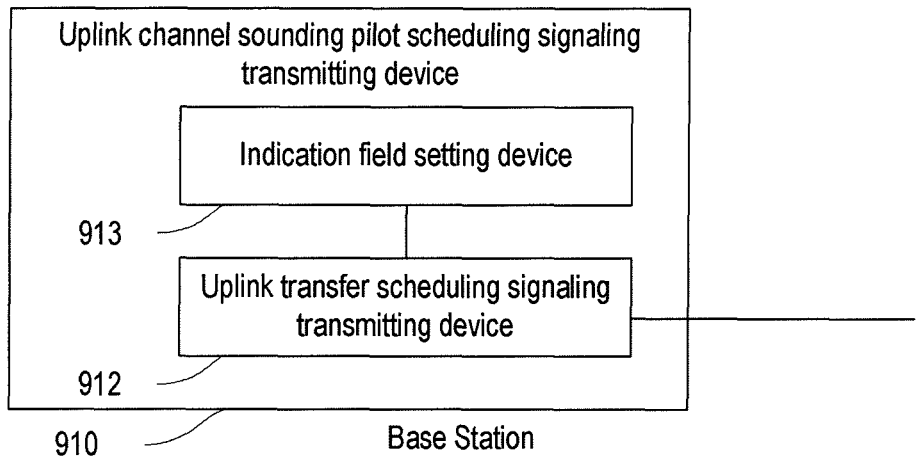
FIG. 12 is a diagram illustrating the structure of a base station according to another embodiment of the invention.

The structure of the base station according to another embodiment may be as shown in FIG. 12. The uplink channel sounding pilot scheduling signaling transmitting device 910 includes an indication field setting device 913 and an uplink transfer scheduling signaling transmitting device 912.

The indication field setting device 913 is configured to set, in an uplink transfer scheduling signaling, an indication field for indicating whether an uplink transfer scheduling signaling or an uplink channel sounding pilot scheduling signaling is carried in the uplink transfer scheduling signaling.

The uplink transfer scheduling signaling transmitting device 912 is configured to transmit the uplink transfer scheduling signaling in which the indication field is set.

In the base station shown in FIG. 11 or 12, the uplink channel sounding pilot scheduling signaling transmitted by the uplink channel sounding pilot scheduling signaling transmitting device 910 includes a subframe including a CS pilot, where the subframe is an uplink subframe that is closest to and separated from a subframe to be processed according to the uplink channel sounding pilot by at least the processing time.

The subframe including the uplink channel sounding pilot is as follows:

when the uplink channel sounding pilot is used for downlink processing, the subframe including the uplink channel sounding pilot is an uplink subframe that is closest to and separated from a subframe on which the downlink processing is carried out according to the uplink channel sounding pilot by at least the processing time; or when the uplink channel sounding pilot is used for uplink processing, the subframe including the uplink channel sounding pilot is an uplink subframe that is closest to and separated from a subframe on which the uplink processing is carried out according to the uplink channel sounding pilot by at least the processing time; or when the uplink channel sounding pilot is used for both uplink processing and downlink processing, if a duration for the uplink processing is larger than a duration of one half frame, the position of the subframe including the uplink channel sounding pilot is determined according to a related duration for the downlink processing; if a subframe that is positioned a duration for the downlink processing before an uplink-to-downlink switching point is not an uplink subframe, the position of the subframe including the uplink channel sounding pilot is determined according to a related duration for the uplink processing; and if a duration for the uplink processing is not larger than a duration of one half frame and a subframe that is positioned a duration for the downlink processing before an uplink-to-downlink switching point is an uplink subframe, the position of the subframe including the uplink channel sounding pilot is determined as a closest uplink subframe that is separated from an uplink subframe to be processed according to the uplink channel sounding pilot by at least a duration for the uplink processing and is separated from a downlink subframe to be processed according to the uplink channel sounding pilot by at least a duration for the downlink processing.

Figure 13:
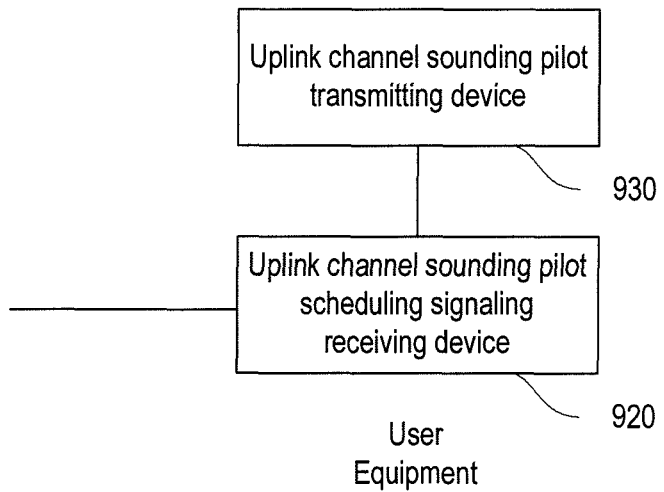
FIG. 13 is a diagram illustrating the structure of a User Equipment according to an embodiment of the invention.

A User Equipment according to an embodiment of the invention will now be introduced, and the diagram of the structure of the User Equipment may be as shown in FIG. 13. The User Equipment includes an uplink channel sounding pilot scheduling signaling receiving device 920 and an uplink channel sounding pilot transmitting device 930.

The uplink channel sounding pilot scheduling signaling receiving device 920 is configured to receive an uplink channel sounding pilot scheduling signaling.

The uplink channel sounding pilot transmitting device 930 is configured to transmit an uplink channel sounding pilot according to an indication in the uplink channel sounding pilot scheduling signaling received by the uplink channel sounding pilot scheduling signaling receiving device 920.

The uplink channel sounding pilot scheduling signaling includes one of or a combination of indication information such as transmission starting time, a transmission period, duration, a resource block index, a subcarrier index, a subframe index, a long block index and a frequency band of the uplink channel sounding pilot.

The uplink channel sounding pilot scheduling signaling received by the uplink channel sounding pilot scheduling signaling receiving device 920 includes a subframe including a CS pilot, where the subframe is an uplink subframe that is closest to and separated from a subframe to be processed according to the uplink channel sounding pilot by at least the processing time.

Correspondingly, the uplink channel sounding pilot transmitting device 930 transmits an uplink channel sounding pilot via the subframe as indicated in the uplink channel sounding pilot scheduling signaling received by the uplink channel sounding pilot scheduling signaling receiving device 920.

The subframe including the uplink channel sounding pilot is as follows:

when the uplink channel sounding pilot is used for downlink processing, the subframe including the uplink channel sounding pilot is an uplink subframe that is closest to and separated from a subframe on which the downlink processing is to be carried out according to the CS pilot by at least the time for the downlink processing; or when the uplink channel sounding pilot is used for uplink processing, the subframe including the uplink channel sounding pilot is an uplink subframe that is closest to and separated from a subframe on which the uplink processing is to be carried out according to the CS pilot by at least the time for the uplink processing; or when the uplink channel sounding pilot is used for both uplink processing and downlink processing, if a duration for the uplink processing is larger than a duration of one half frame, the position of the subframe including the uplink channel sounding pilot is determined according to a related duration for the downlink processing; if a subframe that is positioned a duration for the downlink processing before an uplink-to-downlink switching point is not an uplink subframe, the position of the subframe including the uplink channel sounding pilot is determined according to a related duration for the uplink processing; and if a duration for the uplink processing is not larger than a duration of one half frame and a subframe that is positioned a duration for the downlink processing before an uplink-to-downlink switching point is an uplink subframe, the subframe including the uplink channel sounding pilot is a closest uplink subframe that is separated from an uplink subframe to be processed according to the uplink channel sounding pilot by at least a duration for the uplink processing and is separated from a downlink subframe to be processed according to the uplink channel sounding pilot by at least a duration for the downlink processing.

The process for implementing the transmission of control signaling via the above devices is similar to that described in the above method, and further description thereof is omitted herein.

As can be seen from the above embodiments, with the use of the invention, a User Equipment may be dynamically scheduled to transmit a CS pilot, a solution for carrying a CS pilot scheduling signaling is provided, and a solution for determining the position of the CS pilot in the subframe is also be provided. Moreover, the position of the CS pilot in the subframe can more accurately reflect the conditions of the channel on which uplink and/or downlink processing is performed according to the CS pilot.

Although the invention is described through the embodiments, it may be understood by those skilled in the art that various modifications and variations may be made to the invention without departing from the spirit of the invention. Therefore, these modifications and variations are intended to be covered by the appended claims without departing from the spirit of the invention.

The invention claimed is:

1. A method for transmitting an uplink channel sounding pilot, comprising:
   transmitting, by a base station, an uplink channel sounding pilot scheduling signaling to a User Equipment;
   receiving, by the User Equipment, the uplink channel sounding pilot scheduling signaling; and
   transmitting, by the User Equipment, an uplink channel sounding pilot according to an indication in the uplink channel sounding pilot scheduling signaling;
   wherein, transmitting the uplink channel sounding pilot scheduling signaling comprises:
   adding an uplink channel sounding pilot scheduling field, which is used for carrying the uplink channel sounding pilot scheduling signaling, to an uplink transfer scheduling signaling, and transmitting the uplink transfer scheduling signaling; or
   if the uplink channel sounding pilot scheduling signaling is carried in an uplink transfer scheduling signaling, and an indication field, which used to indicate that the signaling presently transferred is an uplink channel sounding pilot scheduling signaling, is set in the uplink transfer scheduling signaling, transmitting the uplink transfer scheduling signaling.

2. The method of claim 1, wherein, the uplink channel sounding pilot scheduling signaling comprises one of or a combination of indication information comprising transmission starting time, a transmission period, duration, a resource block index, a subcarrier index, a subframe index, a long block index and a frequency band of the uplink channel sounding pilot.

3. The method of claim 1, wherein:
   transmitting the uplink channel sounding pilot scheduling signaling comprises:
   transmitting the uplink channel sounding pilot scheduling signaling comprises a subframe containing the uplink channel sounding pilot, and wherein the subframe containing the uplink channel sounding pilot is an uplink subframe that is closest to and separated from a subframe to be processed according to the uplink channel sounding pilot by at least the time for the processing;
   and transmitting the uplink channel sounding pilot by the User Equipment according to the indication in the uplink channel sounding pilot scheduling signaling comprises:
   transmitting the uplink channel sounding pilot by the User Equipment via the subframe as indicated in the uplink channel sounding pilot scheduling signaling.

4. The method of claim 3, wherein, the position of the subframe containing the uplink channel sounding pilot is determined in that:
   when the uplink channel sounding pilot is used for downlink processing, the subframe containing the uplink channel sounding pilot is an uplink subframe that is closest to and separated from a subframe on which the downlink processing is to be carried out according to the uplink channel sounding pilot by at least the time for the downlink processing; or when the uplink channel sounding pilot is used for uplink processing, the subframe containing the uplink channel sounding pilot is an uplink subframe that is closest to and separated from a subframe on which the uplink processing is to be carried out according to the uplink channel sounding pilot by at least the time for the uplink processing; or when the uplink channel sounding pilot is used for both uplink processing and downlink processing, if a duration for the uplink processing is larger than a duration of one half frame, the position of the subframe containing the uplink channel sounding pilot is determined according to a related duration for the downlink processing; if a subframe that is positioned a duration for the downlink processing before an uplink-to-downlink switching point is not an uplink subframe, the position of the subframe containing the uplink channel sounding pilot is determined according to a related duration for the uplink processing; and if a duration for the uplink processing is not larger than a duration of one half frame and a subframe that is positioned a duration for the downlink processing before the uplink-to-downlink switching point is an uplink subframe, the position of the subframe containing the uplink channel sounding pilot is determined as a closest uplink subframe that is separated from an uplink subframe to be processed according to the uplink channel sounding pilot by at least a duration for the uplink processing and is separated from a downlink subframe to be processed according to the uplink channel sounding pilot by at least a duration for the downlink processing.

5. The method of claim 1, wherein, transmitting the uplink channel sounding pilot by the User Equipment according to the indication in the uplink channel sounding pilot scheduling signaling comprises:

transmitting, by the User Equipment, the uplink channel sounding pilot in a long block at a fixed position according to the indication in the uplink channel sounding pilot scheduling signaling.

6. The method of claim 5, wherein, transmitting the uplink channel sounding pilot further comprises:

when not all of the bandwidth of the long block is occupied by the uplink channel sounding pilot transmitted, using the remaining bandwidth of the long block to transfer data.

7. A base station for transmitting an uplink channel sounding pilot scheduling signaling, comprising: an uplink channel sounding pilot scheduling signaling transmitting device (910), configured to transmit an uplink channel sounding pilot scheduling signaling to a User Equipment;

wherein, the uplink channel sounding pilot scheduling signaling transmitting device (910) comprises an uplink channel sounding pilot adding device (911) and an uplink transfer scheduling signaling transmitting device (912); or the uplink channel sounding pilot scheduling signaling transmitting device (910) comprises an indication field setting device (913) and an uplink transfer scheduling signaling transmitting device (912);

and wherein, the uplink channel sounding pilot adding device (911) is configured to add an uplink channel sounding pilot scheduling field, which is used for carrying the uplink channel sounding pilot scheduling signaling, to an uplink transfer scheduling signaling;

the indication field setting device (913) is configured to set, in an uplink transfer scheduling signaling, an indication field for indicating whether an uplink transfer scheduling signaling or an uplink channel sounding pilot scheduling signaling is carried in the uplink transfer scheduling signaling; and the uplink transfer scheduling signaling transmitting device (912) is configured to transmit the uplink transfer scheduling signaling with the uplink channel sounding pilot scheduling field which is added by the uplink channel sounding of adding device (911) or the uplink transfer scheduling signaling in which the indication field setting device (913) sets the indication field.

8. A User Equipment for transmitting an uplink channel sounding pilot, comprising: an uplink channel sounding pilot scheduling signaling receiving device (920) and an uplink channel sounding pilot transmitting device (930), wherein:

the uplink channel sounding pilot scheduling signaling receiving device (920) is configured to receive an uplink channel sounding pilot scheduling signaling; and the uplink channel sounding pilot transmitting device (930) is configured to transmit an uplink channel sounding pilot according to an indication in the uplink channel sounding pilot scheduling signaling received by the uplink channel sounding pilot scheduling signaling receiving device (920);

wherein, the uplink channel sounding pilot scheduling signaling received by the uplink channel sounding pilot scheduling signaling receiving device (920) comprises a subframe containing the uplink channel sounding pilot, the subframe containing the uplink channel sounding pilot is an uplink subframe that is closest to and separated from a subframe to be processed according to the uplink channel sounding pilot by at least the time for the processing; and the uplink channel sounding pilot transmitting device (930) transmits the uplink channel sounding pilot via the subframe as indicated in the uplink channel sounding pilot scheduling signaling received by the uplink channel sound pilot scheduling signaling receiving device (920).

\* \* \* \* \*